United States Patent [19]

Tanaka

[11] 4,278,331
[45] Jul. 14, 1981

[54] PHOTOGRAPHIC OBJECTIVE WHICH PREVENTS VARIATION IN ANGULAR FIELD OF VIEW DURING FOCUSING

[75] Inventor: Kazuo Tanaka, Tokyo, Japan

[73] Assignee: Canon Kabushiki Kaisha, Tokyo, Japan

[21] Appl. No.: 93,989

[22] Filed: Nov. 14, 1979

[30] Foreign Application Priority Data

Nov. 17, 1978 [JP] Japan .................. 53-141807

[51] Int. Cl.³ ............................................. G02B 15/18
[52] U.S. Cl. ..................................... 350/411; 350/427
[58] Field of Search ................... 350/175 R, 184, 186, 350/214

[56] References Cited

U.S. PATENT DOCUMENTS

| 3,682,534 | 8/1972 | Cook et al. | 350/186 |
| 3,705,759 | 12/1972 | Cook et al. | 350/184 |
| 4,099,845 | 7/1978 | Takesi et al. | 350/184 |
| 4,110,006 | 8/1978 | Ikemori | 350/186 |
| 4,124,274 | 11/1978 | Tanaka | 350/184 |

Primary Examiner—Conrad J. Clark

[57] ABSTRACT

The photographic objective optical system disclosed keeps an exit pupil stationary during focusing, thereby rendering it possible to maintain the angle between a ray of light incident upon the entrance pupil and the systems optical axis constant during focusing. This way variation of the angular field of view during focusing can be avoided.

3 Claims, 8 Drawing Figures

SPHERICAL ABERRATION | ASTIGMATISM | DISTORTION

PHOTOGRAPHIC OBJECTIVE WHICH PREVENTS VARIATION IN ANGULAR FIELD OF VIEW DURING FOCUSING

BACKGROUND OF THE INVENTION

This invention relates to photographic objectives and more particularly to objectives with means for limiting variation of the angular field of view during focusing. Still more particularly it relates to zoom lenses employing such means.

In known lens systems, the front member facing the object is usually made movable to effect focusing. This is particularly so in zoom lenses because of the need to provide for zoom members, namely, a variator and a compensator with an object point (an image point of the focusing member) at a constant location independently of the distance from the lens to the object so as to avoid displacement of a sharp image plane while zooming.

This method of focusing when employed in an objective lens system and in particular a zoom lens system causes a serious problem by varying the angular field of view. In most photographic situations, a change in the angular field of view in the object space is perceptible during focusing which gives the photographer an unpleasant visual impression.

Various solutions to minimize the range of variation of the angular field during focusing have been proposed. According to P. Angenieux (British Pat. No. 975,160) and Takano (Japanese Patent Application Publication No. Sho 42-12103), the front member of the zoom lens is constructed from two lenses of negative and positive powers of which the frontmost negative lens only is made movable for focusing purposes for minimizing the angular field variation. According to G. H. Cook et al. (U.S. Pat. No. 3,682,534), the front member is divided into two parts and the front part is stationary during the focusing movement of the rear part. This reduces the angular field variation. According to Takeshi et al (U.S. Pat. No. 4,099,845), the front member comprises negative, positive and positive lens groups of which only the second is moved toward the rear as focusing is effected down to shorter object distances so as to minimize the angular field of view. The principal aims of these focusing lens designs were to reduce the diameter of the front member and to shorten the object distance for close up adjustment. The minimization of the variation of the angular field may be considered as being secondary. What P. Angenieux, Takano, G. H. Cook et al and Takeshi et al have done in respect to the change in the angular field is, therefore, the mere reduction of the range of variation, and much variation remains.

Unlike these focusing methods, Tanaka has achieved the removal of the variation of the angular field by moving two lens groups which are arranged at the front of an optical lens system in a differential relation to each other such that the rear principal point of the lens system remains stationary in position during focusing, as disclosed in West-German Utility Model No. 7,908,085. However, it has been found that Tanaka's method, though suited for application in the lens system in which the rear principal point of the entire system is near the exit pupil, gives rise to errors when applied to a lens system in which the rear principal point and the exit pupil are substantially separated from each other.

SUMMARY OF THE INVENTION

An object of the present invention is to improve objective lenses.

It is another object of the present invention to eliminate the above mentioned conventional drawbacks and to privide a photographic objective having a focusing means which operates without causing any change in the angular field of view during focusing.

According to the present invention, this is achieved in an optical lens system whose exit pupil remains stationary during focusing, by a focusing means for maintaining the angular magnification of the pupil image unchanged over the focusing range so that variation of the angular field of view is prevented.

Thus, the invention makes it possible to insure that the angle which an oblique pencil of rays meeting the optical axis of the system at an entrance pupil plane makes with the optical axis thereof is maintained unchanged over the focusing range.

This focusing method of the invention can be realized in a photographic objective having a diaphragm with the lens group to the rear of the diaphragm being held stationary during focusing, and including at least two movable lens groups for focusing at the front of the diaphragm.

For example, a zoom lens employing the focusing method of the invention comprises first and second lens groups movable for focusing, and third and fourth lens groups stationary during focusing with a diaphragm being positioned between the third and fourth lens groups. The third lens group includes lens members movable for zooming, and the fourth lens group and the diaphragm are stationary during zooming. When focusing is performed, therefore, the exit pupil of the lens system assumes a constant position. To prevent variation of the angular field during focusing, the first and second lens groups are moved axially but in variable or differential relation to each other so that a ray of light coming from an object point at the limit of a prescribed angular field of view is always directed to the center of the entrance pupil, and the angle of inclination of that ray with the optical axis on the entrance pupil is constant.

DESCRIPTION OF THE PREFERRED EMBODIMENT

Figure 1:
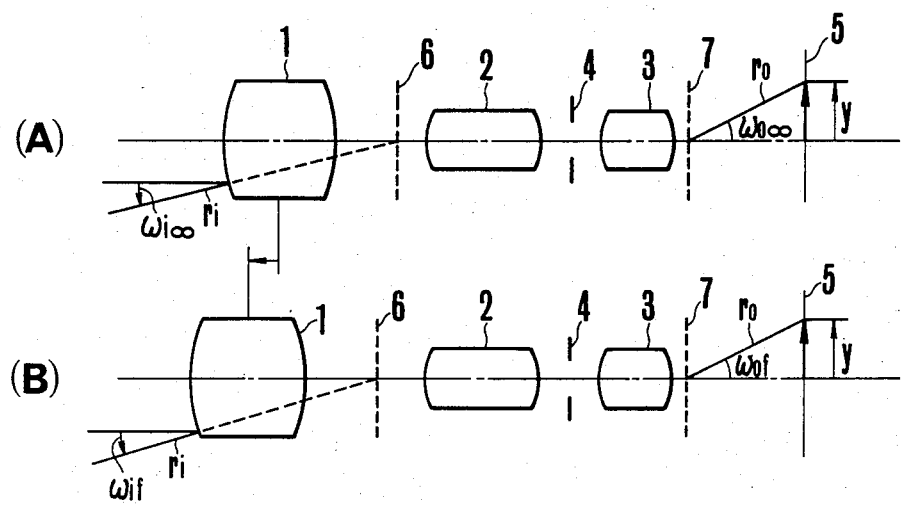
FIGS. 1(A) and 1(B) are block diagrams showing a a photographic objective optical system according to the invention in two focusing positions.

FIGS. 1A and 1B schematically show a general example of arrangement of the lens groups constituting a photographic objective provided with the focusing method of the present invention FIG. 1(A) illustrates the focusing position for an infinitely distant object and FIG. 1(B) the focusing position for object at a finite distance. At the front of the objective of FIG. 1 a lens member assembly 1 is movable for focusing, and which is followed by two lens groups 2 and 3 which are stationary during focusing. A diaphragm 4 is positioned in a space between the groups 2 and 3. Plane 5 is a focal plane. Entrance and exit pupils of the lens system are shown by dashed lines at 6 and 7 respectively. Since the exit pupil 7 is always at located at a constant position, a ray of light, $r_O$, emerging from the center of the exit pupil 7 and impinging on the focal plane 5 at an image height, y, and the optical axis form angles $\omega o_\infty$ and $\omega o_f$ which are equal to each other when focused on the infinitely and finitely distant objects respectively. Thus, we may write: $\omega o_\infty = \omega o_f = \omega o$. Responsible for the above described ray, $r_O$, is a ray, $r_i$, in the object space, that is, coming from an object point at the limit of a prescribed angular field of view. To prevent variation of the angular field during focusing, the ray $r_i$ must always meet the optical axis at the entrance pupil plane 6 at the angle of incidence of the ray, $r_i$, on the same entrance. In other words, if $\omega i_\infty$ and $\omega i_f$ are the angles of incidence when focusing is effected at infinity and at a finite object distance respectively, we have $\omega i_\infty = \omega i_f$. By making $\omega_{i\infty} = \omega_{if} = \omega_i$, we obtain the angular magnification of the pupil image expressed as:

$$\omega o_\infty / \omega i_\infty = \omega o_f / \omega i_f = \omega o / \omega i = \text{const.}$$

The object of the present invention is accomplished by focusing the objective lens while simultaneously satisfying the above defined relationship. For this purpose, at least two lens members in group 1 on the front of the diaphragm 4 must be moved axially independently of each other.

This can be best appreciated from considering the axial movements of two focusing members, as shown in FIGS. 2A and 2B. This lens system comprises, from front to rear, first and second lens groups 11 and 12 movable for focusing, and third and fourth lens groups 13 and 14 stationary during focusing with a diaphragm 15 intervening between the third and fourth lens groups. If the lens system is of the zoom type, it is the common practice that the third lens group 13 includes zoom members, and the fourth lens group 14 is in the form of a relay lens. Images of the plane of the diaphragm 15 are formed by the lens system at 17 and 18 for the entrance and exit pupils respectively. The principal ray of an oblique pencil from an object-point at the extreme margin of the intended field of view passes through the center of the diaphragm 15 to a focal plane 16 at a maximum height of incidence, y'. We now take FIG. 2(A) for the lens system focused upon an infinitely distant object as the starting point. To effect focusing down to a finite object distance, that is, upon an object 19 at a distance $S_1$ measured from the front principal plane of the first lens group 11, as shown in FIG. 2(B), the first and second focusing lens groups 11 and 12 are moved axially along respective distances $x_1$ and $x_2$, from the positions of FIG. 2(A).

For the purpose of defining the entering and exiting rays in the above described two focusing positions, the selection of all necessary parameters is as follows. At infinity (the starting point), $e'_{i2\infty}$ is the interval between the rear principal point of the i-th lens group and the front principal point of the (i+1)th lens group, l the distance from the diaphragm 15 to the front principal point of the 4th lens group 14, $S'_F$ the backfocus, $t'_{K\infty}$ the distance from the rear principal point of the 4th lens group 14 to the exit pupil 18, and $\bar{\alpha}'_{1\infty}$ the angle of inclination of the entering ray. The refractive power of the i-th lens group is denoted by $\psi_i$. With the first and second lens groups moved from the starting point by the $x_1$ and $x_2$ to focus upon the object 19 at the distance $S_1$, let $S'_K$ denote the back focus, $\bar{\alpha}'_1$ the angle of inclination of the entering ray, and $t'_K$ the distance from the rear principal point of the 4th lens group 14 to the exit pupil 18.

Since the exiting, or principal ray of the extreme oblique pencil, or pencil ray, in the starting point can be defined by the angle of inclination, $\bar{\alpha}'_{4\infty}$, and the height $\bar{h}_{4\infty}$ from the optical axis as follows:

$$\bar{\alpha}'_{4\infty} = - \frac{y'}{S'_F - t'_{K\infty}}, \quad \bar{h}_{4\infty} = \bar{\alpha}'_{4\infty} \cdot t'_{K\infty}$$

we obtain the angle of inclination, $\bar{\alpha}_{1\infty}$, of the entering ray on the first lens group 11, as expressed by:

$$\bar{\alpha}_{1\infty} = -C_\infty h_{4\infty} + A_\infty \bar{\alpha}'_{4\infty}$$

where $C_\infty$ and $A_\infty$ are functions of $\psi_1, \psi_2, \psi_3, \psi_4, e'_{1\infty}, e'_{2\infty}$ and $e'_{3\infty}$.

From this, we have the ration $\Gamma_\infty$ of the angle of inclination of the entering ray to the angle of inclination of the exiting ray.

$$\Gamma_\infty = -C_\infty t'_{K\infty} + A_\infty$$

On the other hand, the angle of inclination of the entering ray in the focusing position for the finite object distance $S_1$ can be defined by $$\bar{\alpha}_1 = -C\bar{h}_{4\infty} + A\bar{\alpha}'_{4\infty}$$

where A and C are functions of $\psi_1, \psi_2, \psi_3, \psi_4, e'_{1\infty}, e'_{2\infty}, e'_{3\infty}, x_1$ and $x_2$. If the $x_1$ and $x_2$ are related to each other so as to establish the following equation throughout the entire focusing range, it will be possible to effect focusing of the lens system without causing variation of the angular field of view.

$$\bar{\alpha}_{1\infty} = \bar{\alpha}_1$$

By re-arranging this equation for $x_1$, we have $$x_1 = (e'_{1\infty} + x_2) - \frac{1}{\psi_1} - \frac{B^* - D^* t'_{K\infty}}{A^* - C^* t'_{K\infty}} + \frac{\Gamma_\infty}{(A^* - C^* t'_{K\infty})\psi_1}$$

where $$A^* = \psi_2\psi_3(e'_{2\infty} - x_2)e'_{3\infty} - \psi_2(e_{2\infty} - x_2) - \psi_2 e'_{3\infty} - \psi_3 e'_{3\infty} + 1$$

$$B^* = \psi_3(e'_{2\infty} - x_2)e'_{3\infty} - (e'_{2\infty} - x_2) - e'_{3\infty}$$

$$C^* = \psi_2\psi_3\psi_4(e'_{2\infty} - x_2)e'_{3\infty} - \psi_2\psi_3(e'_{2\infty} - x_2) - \psi_2\psi_4(e'_{2\infty} - x_2) - \psi_2\psi_4 e'_{3\infty} - \psi_3\psi_4 e'_{3\infty} + \psi_2 + \psi_3 + \psi_4$$

$$D^* = \psi_3\psi_4(e'_{2\infty} - x_2)e'_{3\infty} - \psi_3(e'_{2\infty} - x_2) - \psi_4(e'_{2\infty} - x_2) - \psi_4 e'_{2\infty} + 1$$

Figure 2:
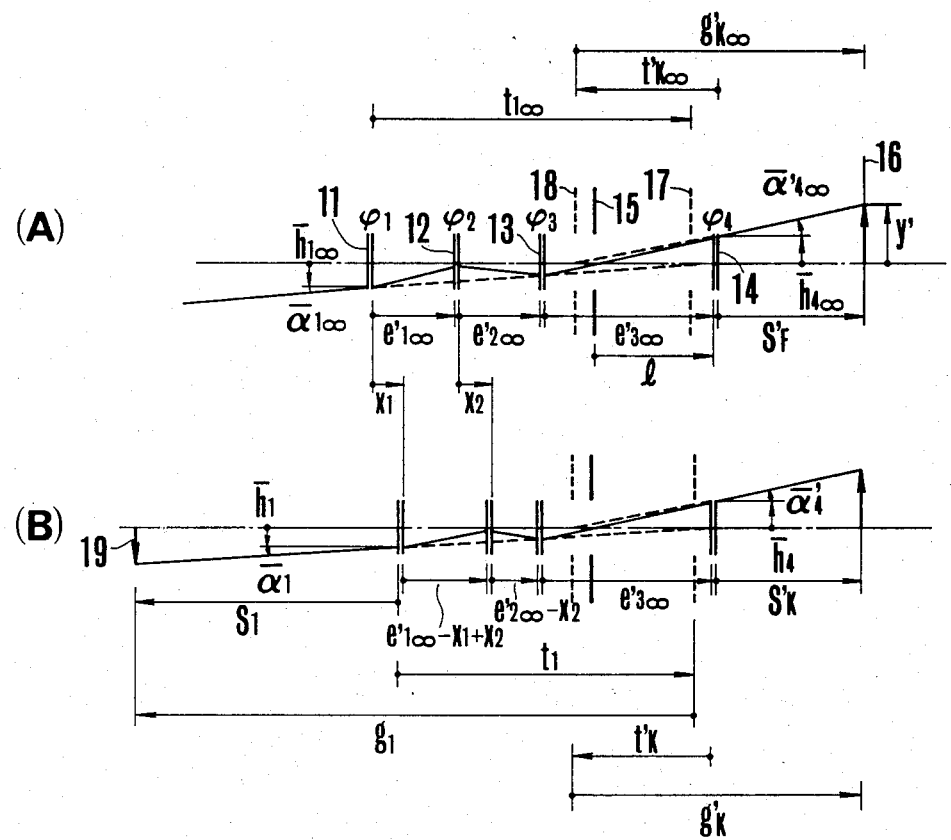
FIGS. 2(A) and 2(B) are diagrams of geometry considered in calculating axial movements of the two focusing members of the objective of FIG. 1.

We have now shown that, with the lens system of FIG. 2, when the first and second lens groups 11 and 12 are moved axially in the differential relation defined above, the angular field of view can be maintained unchanged during focusing.

Figure 3:
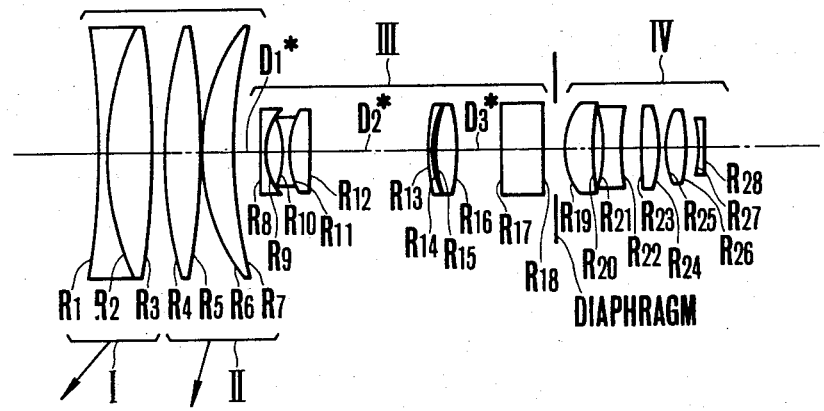
FIG. 3 is a lens block diagram of one embodiment of a zoom lens employing the focusing method of the invention.

FIG. 3 is a block diagram of a zoom lens to which the focusing method of the present invention is applied.

This zoom lens comprises from front to rear, a first lens group I with surfaces $R_1$ and $R_3$ movable in unison for focusing, a second lens group II with surfaces $R_4$ to $R_7$ movable in unison for focusing but in a different manner to that of the first lens group I, a third lens group III with surfaces $R_{19}$ to $R_{28}$ movable for zooming, a diaphragm, and a fourth lens group IV. The shortest focal length of this lens system is chosen so as to cover a total angular field of 21.9°.

According to a preferred embodiment of the present invention, the zoom lens system can be constructed as represented by the numerical values in the following table for the radii of curvature, r, the axial separations between the successive surfaces, d, and the indices of refractions of the lens elements, n.

| Surface No. | r | d | n |
| --- | --- | --- | --- |
| $R_1$ | −132.96400 | 1.20000 | 1.80518 |
| $R_2$ | 47.72900 | 7.98000 | 1.56732 |
| $R_3$ | −125.08600 | 1.96000 | 1. |
| $R_4$ | 71.50800 | 6.29000 | 1.69680 |
| $R_5$ | −114.88800 | 0.20000 | 1. |
| $R_6$ | 34.21200 | 5.40000 | 1.68250 |
| $R_7$ | 61.80500 | $D^*_1$ | 1. |
| $R_8$ | 363.04900 | 0.90000 | 1.69350 |
| $R_9$ | 12.19500 | 2.61000 | 1. |
| $R_{10}$ | −16.67100 | 0.90000 | 1.69350 |
| $R_{11}$ | 13.78500 | 2.79000 | 1.80510 |
| $R_{12}$ | −7680.84800 | $D^*_2$ | 1. |
| $R_{13}$ | 39.08800 | 0.90000 | 1.64760 |
| $R_{14}$ | 17.07000 | 0.54000 | 1. |
| $R_{15}$ | 18.36700 | 3.78000 | 1.51630 |
| $R_{16}$ | −30.86400 | $D^*_3$ | 1. |
| $R_{17}$ | 0.00000 | 7.50000 | 1.51630 |
| $R_{18}$ | 0.00000 | 1.14000 | 1. |
| $R_{19}$ | 0.00000 | 2.50000 | 1. |
| $R_{20}$ | 13.40500 | 4.64000 | 1.66670 |
| $R_{21}$ | 75.66400 | 2.24000 | 1. |
| $R_{22}$ | −22.09500 | 3.00000 | 1.80510 |
| $R_{23}$ | 33.76300 | 3.41000 | 1. |
| $R_{24}$ | 125.65400 | 4.20000 | 1.66670 |
| $R_{25}$ | −20.05400 | 0.30000 | 1. |
| $R_{26}$ | 15.04800 | 2.99000 | 1.65840 |
| $R_{27}$ | −35.23000 | 2.26000 | 1. |
| $R_{28}$ | −14.82900 | 0.80000 | 1.80510 |
| $R_{29}$ | −78.15000 | 9.50094 | 1. |

The values of the parameters of FIG. 2:

| | | | | |
| --- | --- | --- | --- | --- |
| $\psi_1$ | = | −.00625 | $e'_{1\infty}$ = | 13.2 |
| $\psi_2$ | = | .02767059 | $e'_{2\infty}$ = | −48.05168 |
| $\psi_3$ | = | −.01067006 | $e'_{3\infty}$ = | 26.25151 |
| $\psi_4$ | = | .04871405 | l = | 10.38369 |
| | | | y' = | 3.58 |

| Focal Length | $D^*_1$ | $D^*_2$ | $D^*_3$ |
| --- | --- | --- | --- |
| 9.43 (Wide Angle Setting) | 4.60509 | 19.951 | 7.298 |
| 45.28 (Telephoto Setting) | 23.1851 | 1.362 | 7.298 |

Figure 4:
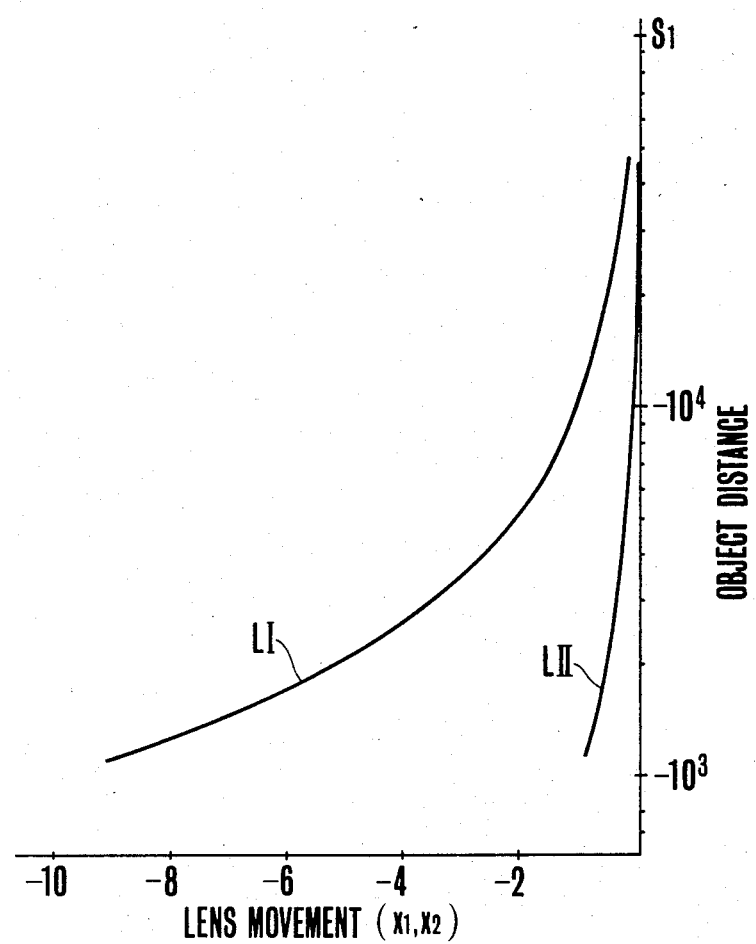
FIG. 4 is a graph representing the changes in the positions of the movable members for focusing of FIG. 3.
Figure 5:
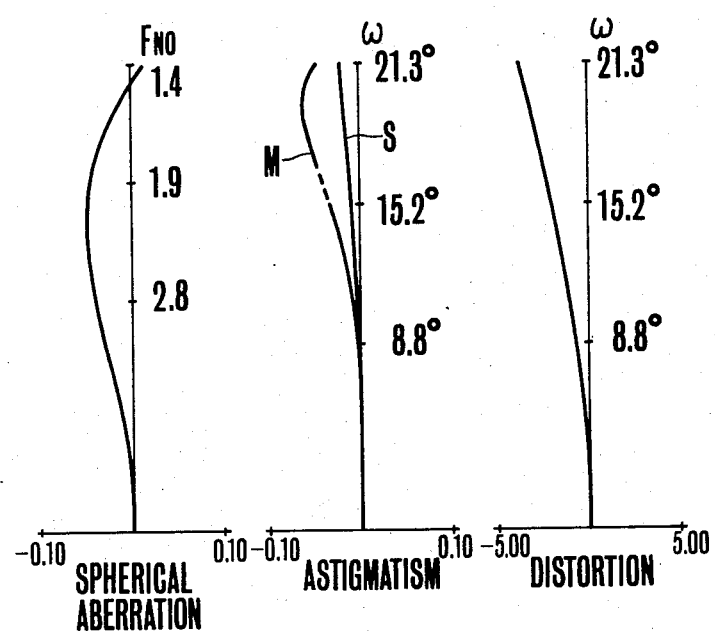
FIGS. 5 and 6 are graphic representations of various aberrations in the zoom lens of FIG. 3 in two focusing positions.
Figure 5:
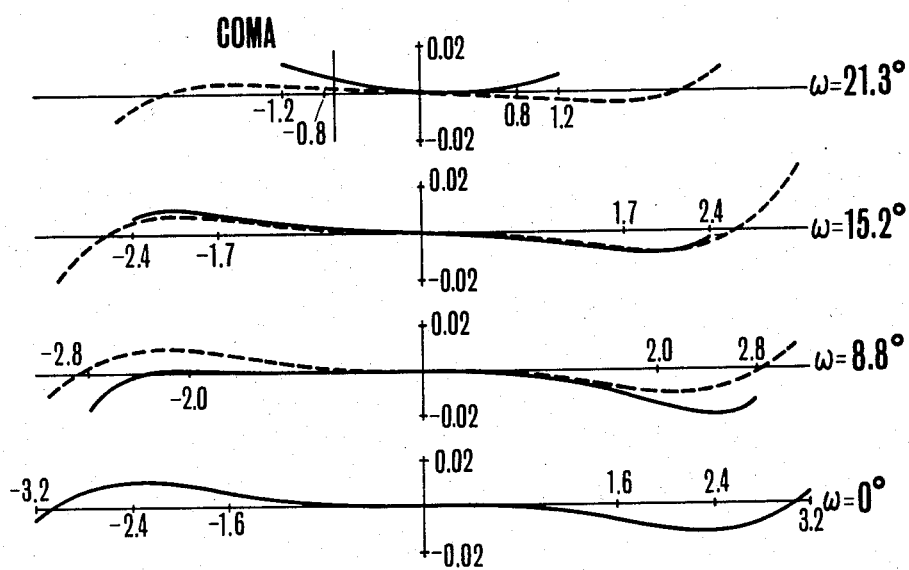
Figure 6:
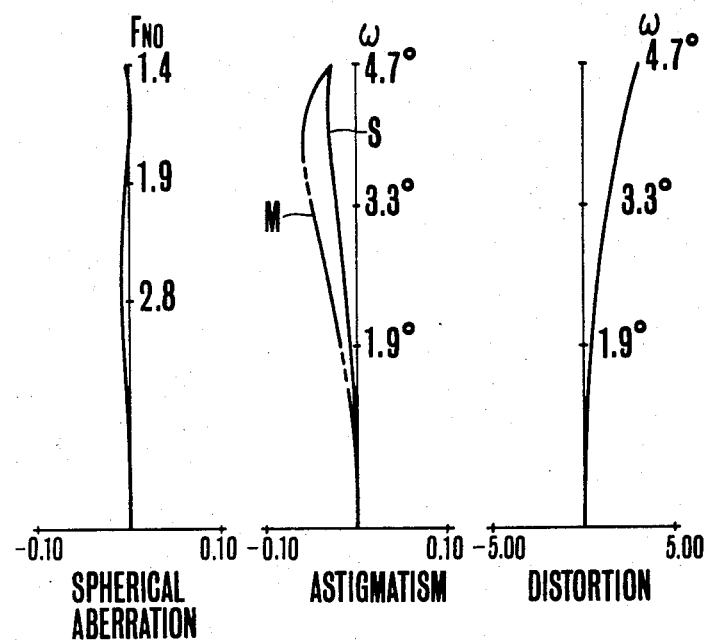
Figure 6:
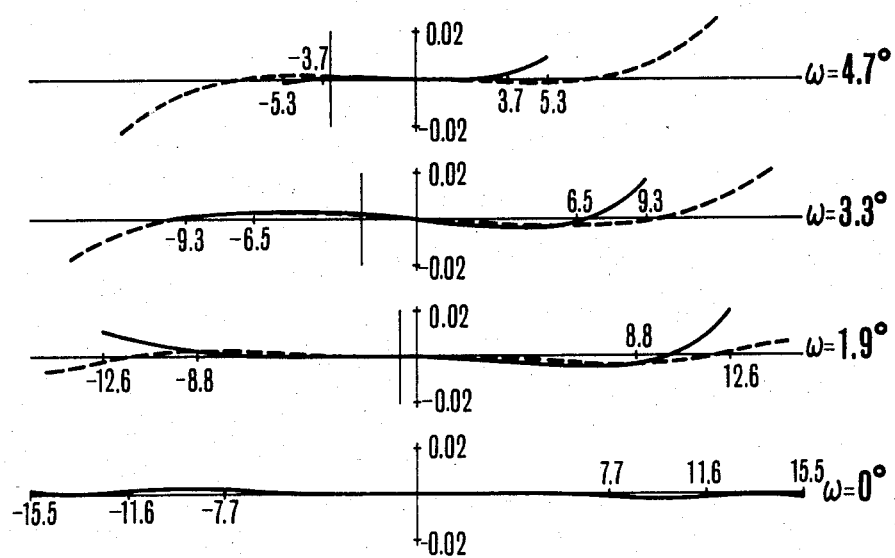

The changes in the positions of the first and second focusing lens groups I and II during focusing are depicted in the graph of FIG. 4 where the curves for the first and second lens groups I and II are labelled $L_I$ and $L_{II}$ respectively, and where the ordinate is in the object distance, and the abscissa is in the amount of movement of the lens group. The plus and minus values of the amount of movement of the lens group indicate that the lens group is moved toward the image plane and the object respectively. The both curves $L_I$ and $L_{II}$ reach zero in $x_1$ and $x_2$ when the lens groups are focused at infinity. It is further noted that the object distance is measured from the front principal plane of the first lens group, and that the object distance is of negative sign because the object lies to the right of the lens system.

FIGS. 5A to 5G are graphic representations of the spherical aberration, astigmatism, distortion and coma of the lens system of FIG. 3 in the wide angle settings when focused at infinity, and FIGS. 6A to 6G are similar representations of the various aberrations in the telephoto settings when focused at infinity.

It will be seen from the foregoing that the present invention provides a photographic objective constructed by use of an optical system whose exit pupil remains stationary at a location during focusing in combination with focusing means in which the principal ray of an oblique pencil ray from the object space always aims at the center of the entrance pupil, and the angle of that principal ray with the optical axis is maintained unchanged during focusing. Hence, variation of the angular field of view can be prevented.

What is claimed is:

1. A photographic objective comprising:
    a focusing lens group arranged at the front thereof and including at least two lens members movable for focusing independently of each other;
    a lens group arranged to the rear of said focusing lens group and stationary during focusing; and
    said focusing lens group having focusing means and means for preventing variation of the angular field of view of said objective during focusing.

2. A photographic objective according to claim 1, wherein during focusing said movable members of said focusing lens group are movable in differential relation to each other such that the angle between a ray of light directed at the entrance pupil of said objective and an optical axis of said objective remains constant during focusing.

3. A photographic objective according to claim 2, wherein said objective comprises, from front to rear, first and second lens groups movable for focusing, and third and fourth lens groups stationary during focusing, a diaphragm intervening between said third and said fourth lens groups, and during focusing, the amount of movement $x_1$ of said first lens group and the amount of movement $x_2$ of said second lens group are related to each other by the following formula:

$$x_1 = (e'_{1\infty} + x_2) - \frac{1}{\psi_1} - \frac{B^* - D^* t'_{K\infty}}{A^* - C^* t'_{K\infty}} + \frac{\Gamma_\infty}{(A^* - C^* t'_{K\infty})\psi_1}$$

where $$A^* = \psi_2\psi_3(e'_{2\infty} - x_2)e'_{3\infty} - \psi_2(e'_{2\infty} - x_2) - \psi_2 e'_{3\infty} - \psi_3 e'_{3\infty} + 1$$

$$B^* = \psi_3(e'_{2\infty} - x_2)e'_{3\infty} - (e'_{2\infty} - x_2) - e'_{3\infty}$$

$$C^* = \psi_2\psi_3\psi_4(e'_{2\infty} - x_2)e'_{3\infty} - \psi_2\psi_3(e'_{2\infty} - x_2) - \\ \psi_2\psi_4(e'_{2\infty} - x_2) - \psi_2\psi_4 e'_{2\infty} - \psi_3\psi_4 e'_{3\infty} + \psi_2 + \psi_3 + \psi_4$$

$$D^* = \psi_3\psi_4(e'_{2\infty} - x_2)e'_{3\infty} - \psi_3(e'_{2\infty} - x_2) - \psi_4(e'_{2\infty} - x_2) - \\ \psi_4 e'_{3\infty} + 1$$

wherein
    $e'_{i\infty}$ = the distance from the rear principal point of the i-th lens group to the front principal point of the (i+1)th lens group in the lens system when focused at infinity;
    $\psi_i$ = the refractive power of the i-th lens group;
    $t'_{K\infty}$ = the distance from the rear principal point of the fourth lens group to the exit pupil; and
    $\Gamma_\infty$ = the ratio of the angle of inclination (field angle) of a principal ray incident on the first lens group to the angle of inclination of the principal ray emerging from the fourth lens group in the lens system when focused at infinity.

* * * * *